United States Patent
Sawada et al.

(10) Patent No.: US 6,766,661 B2
(45) Date of Patent: Jul. 27, 2004

(54) METHOD OF MANUFACTURING GLASS OPTICAL ELEMENTS

(75) Inventors: Hiroyuki Sawada, Akishima (JP); Yoshitaka Goto, Fussa (JP)

(73) Assignee: Hoya Corporation, Tokyo (JP)

( * ) Notice: Subject to any disclaimer, the term of this patent is extended or adjusted under 35 U.S.C. 154(b) by 221 days.

(21) Appl. No.: 09/943,501

(22) Filed: Aug. 31, 2001

(65) Prior Publication Data

US 2002/0053222 A1 May 9, 2002

(30) Foreign Application Priority Data

Sep. 1, 2000 (JP) ........................................ 2000-265300

(51) Int. Cl.$^7$ .............................................. C03B 11/00
(52) U.S. Cl. ............................................ 65/102; 65/85
(58) Field of Search ............................. 65/29.15, 29.21, 65/37, 66, 83, 85, 102, 137, 162, 306, 318, 319, 356; 425/808; 501/900

(56) References Cited

U.S. PATENT DOCUMENTS 5,228,894 A * 7/1993 Sato et al. .................... 65/102

2001/0039811 A1 * 11/2001 Tomisaka .................... 65/102

FOREIGN PATENT DOCUMENTS

JP 07-267658 10/1995

* cited by examiner

*Primary Examiner*—Sean Vincent
(74) *Attorney, Agent, or Firm*—Oblon, Spivak, McClelland, Maier & Neustadt, P.C.

(57) ABSTRACT

Provided is a method for manufacturing a glass optical element comprising steps of: molding a glass material softened with a molding device which comprises an upper mold having a molding surface and a lower mold having a molding surface so that optically functional surfaces are formed on the glass material by applying a molding pressure, cooling the glass material so that the glass material obtains a predetermined viscosity, and removing the cooled glass material from the molding device, wherein a temperature of the glass material is maintained, in the cooling step, within a range of (Tg+30) to (Tg−50) degree centigrade at least for a predetermined time, and a secondary pressure is applied to the glass material at least during the predetermined time, so that the strain in the glass material is reduced, where Tg represents glass transition temperature of the glass.

28 Claims, 7 Drawing Sheets

METHOD OF MANUFACTURING GLASS OPTICAL ELEMENTS

FIELD OF THE INVENTION

The present invention relates to a method of manufacturing glass optical elements by molding glass materials with high surface precision, including lenses in which one or both surfaces are concave. In particular, the present invention relates to a method permitting the manufacture of glass optical elements by molding glass materials with high surface precision, including lenses having a ratio b/a of the peripheral thickness b to the center thickness a of at least 1.5.

BACKGROUND OF THE INVENTION

Methods in which softened glass is pressed with a forming mold having a shape identical or similar to that of a product to directly manufacture lenses without grinding or polishing (high-precision pressing methods) are widely utilized. Since high-precision pressing permits the manufacturing of large quantities of lenses of both spherical and aspherical surfaces at low price, it is employed to manufacture the optical system lenses of a variety of optical equipment and products such as digital cameras and video cameras. In recent years, demands have been made of high-precision pressing to manufacture lenses that are large and difficult to mold.

However, in lenses in which one or both surfaces are concave and in lenses in which there is a large difference in thickness between the center and the edge (rim) portions of the lens, once molded surfaces are transferred to the glass by the pressing process, the transfer surface often deforms during cooling and removal from the forming mold or during annealing, making it impossible to obtain a lens of desired surface shape. This is particularly acute in lenses having two concave surfaces with a large difference in thickness between the center and edge portions.

Japanese Unexamined Patent Publication No. Hei 7-267658 describes a method of molding concave meniscus lenses in which a glass material in a softened state is pressed to obtain a glass optical element wherein the pressed glass is maintained at a certain temperature at or above the glass transition temperature for a prescribed time in a cooling step. While this method is principally directed to removal of the thermal stress that has been generated in the glass material within a short period, it does not permit the molding of lenses with desired surface shapes that are particularly hard to achieve, which are those the present invention focuses upon.

SUMMARY OF THE INVENTION

Accordingly, an object of the present invention is to provide a method of manufacturing glass optical elements such as glass lenses by press-molding glass materials with high precision, including lenses that are concave on one or both surfaces and have a large b/a ratio, where a denotes center thickness and b denotes peripheral thickness.

Research conducted by the present inventors resulted in the discovery that by subjecting a molded product in the form of a lens to a prescribed pressure within a certain temperature range after the press-molding and up to the removal from the forming mold, the above-stated problem was solved; the present invention was devised on this basis.

The present invention relates to a method for manufacturing a glass optical element comprising steps of:

molding a glass material softened by heat with a forming mold which comprises an upper mold and a lower mold, each having a molding surface so that optically functional surfaces are formed on the glass material by applying a molding pressure, cooling the glass material so that the glass material obtains a predetermined viscosity, and removing the cooled glass material from the forming mold, wherein a temperature of the glass material is maintained, in the cooling step, within a range of (Tg+30) to (Tg−50) degrees centigrade at least for a predetermined time, and a secondary pressure is applied to the glass material at least during the predetermined time, so that the strain in the glass material is reduced, where Tg represents glass transition temperature of the glass.

DETAILED EXPLANATION OF THE INVENTION

Figure 1:
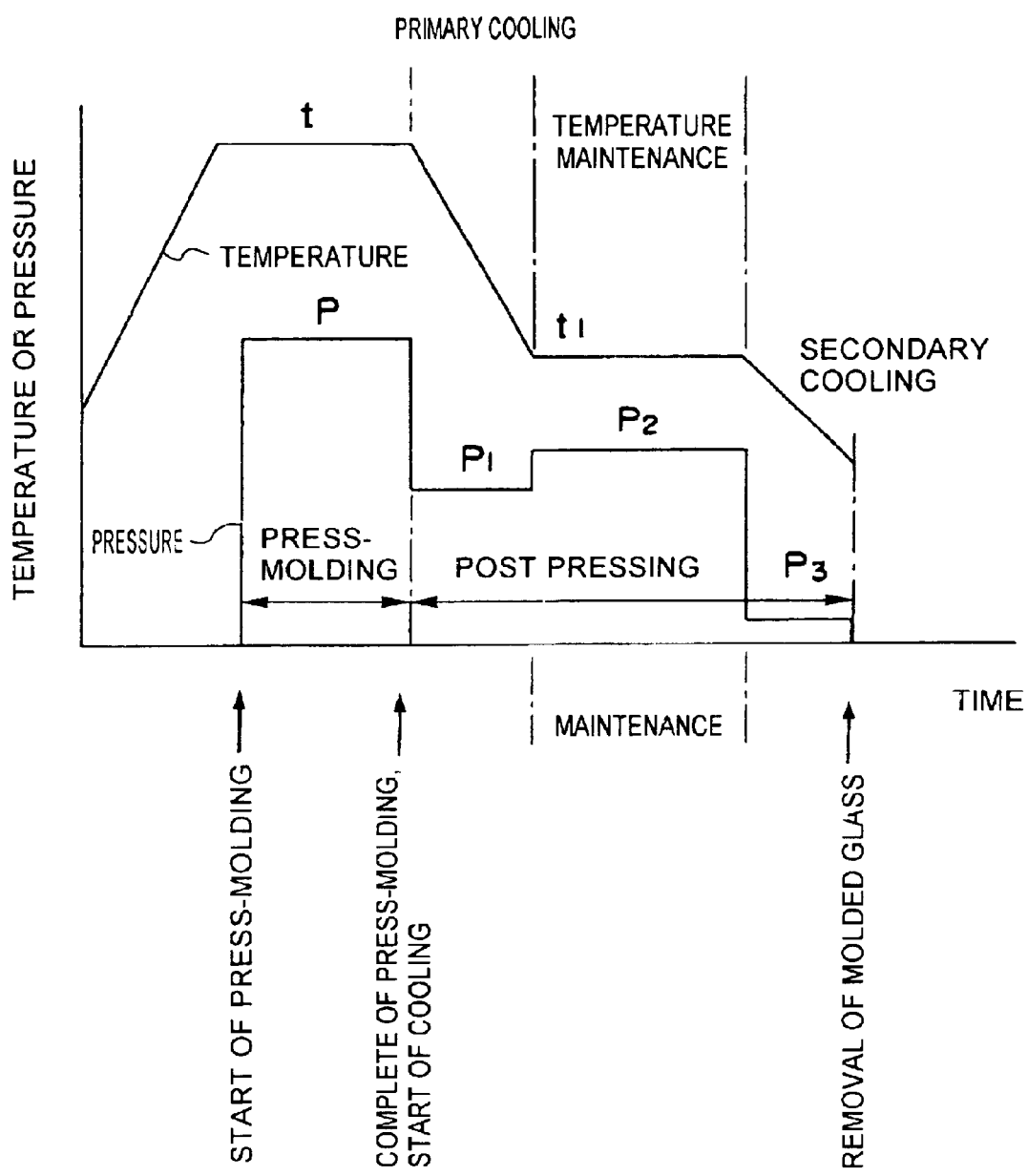
FIG. 1 shows typical changes over time in temperature and pressure in the manufacturing method of the present invention.

The method of manufacturing glass optical elements of the present invention comprises the steps of:

molding a glass material softened by heat with a forming mold which comprises an upper mold and a lower mold, each having a molding surface so that optically functional surfaces are formed on the glass material by applying a molding pressure, cooling the glass material so that the glass material obtains a predetermined viscosity, and removing the cooled glass material from the forming mold.

In the molding step, a softened glass material is subjected to pressure in a forming mold comprising an upper mold and a lower mold having forming surfaces for the forming of optically functional surfaces on a glass material to transfer shapes of said forming surfaces to said glass material.

In the cooling step, the forming mold is cooled, for example, until the glass to which said forming surfaces have been transferred reaches a prescribed viscosity.

In the removal step, the cooled glass is recovered from said forming mold.

In the cooling step of the manufacturing method of the present invention, a temperature of the glass material is maintained within a range of (Tg+30) to (Tg−50) degrees centigrade at least for a predetermined time, and a secondary pressure is applied to the glass material at least during the predetermined time, whereby the strain in the glass material is reduced. That is, the glass material is subjected to post pressing in the cooling step and internal distortion of the glass produced by cooling is alleviated by maintaining the glass within the prescribed temperature range.

In the method of the present invention, it is preferred that the secondary pressure is substantially continuously applied, following the application of molding pressure and up to the removing. That is, the post pressing is conducted so as to begin without interruption of pressure following pressing to transfer forming surfaces.

It is also preferred that the secondary pressure is preferably smaller than the molding pressure and that the secondary pressure is set at pressure P1 before the beginning of the predetermined time and the secondary pressure is set at pressure P2 during the predetermined time, where P2 is greater than P1.

In a preferred embodiment of the present invention, temperature variation of the glass material of which temperature is maintained in the cooling step is preferably 5 degrees centigrade per minute or less, and more preferably substantially null.

In another preferred embodiment of the present invention, in the cooling step, the temperature of the glass material is maintained within (Tg) to (Tg−50) degrees centigrade, preferably (Tg) to (Tg−20) degrees centigrade at least for the predetermined time and temperature variation of the glass material of which temperature is maintained in the cooling step is 5 degrees centigrade per minute or less.

In still another preferred embodiment of the present invention, the secondary pressure is preferably started to apply when a center thickness of the glass material is within ±0.2 mm range of the glass optical element.

The manufacturing method of the present invention will further be described in view of FIG. 1.

First, softened glass material is pressed with a forming mold and forming surfaces of the forming mold are transferred to the glass material. The glass material may be a glass preform that has been molded in advance to a prescribed shape, or a glass gob. The glass material may, for example, be double-convex in shape. A glass material is employed that has been adjusted (softened) to a temperature suited to press-molding. The glass material may be in the form of a glass preform or a glass gob that has been prepared from molten glass and is employed without returning it to room temperature. Alternatively, the glass material may also be in the form of a glass gob or a glass preform that has been returned to room temperature and then softened by reheating.

The forming mold comprises an upper mold and a lower mold. So long as the forming mold comprises an upper mold and a lower mold, each having a forming surface forming optically functional surfaces on the glass material, there are no particular restrictions. Known forming molds may be suitably employed with or without further modifications.

Figure 2:
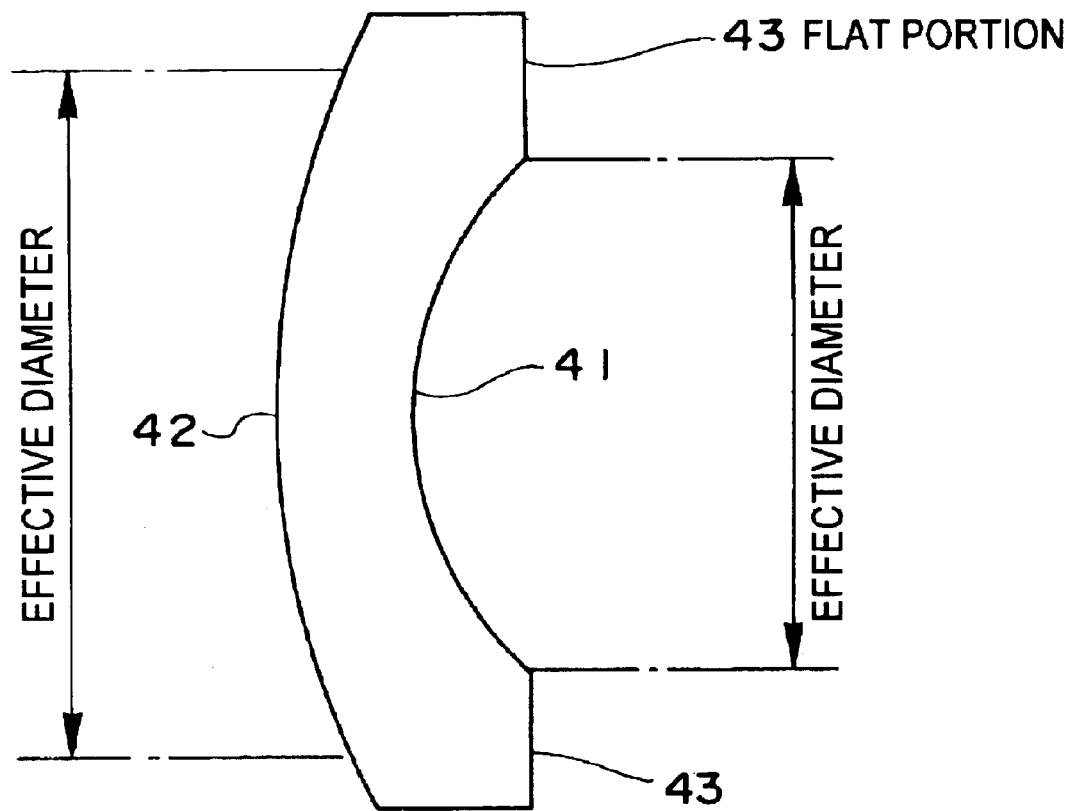
FIG. 2 is a drawing descriptive of a concave meniscus lens comprising a flat portion perpendicular to the optical axis on the outside of one of the optically functional surfaces.

The concave meniscus lens and double-concave lenses that are manufactured by the manufacturing method of the present invention have optically functional surfaces (optically effective regions) for incorporation into various lens systems. For example, the concave surface denoted by 41 in FIG. 2 is such a surface. In this case, flat portion 43 perpendicular to the optical axis is provided on the outside of concave surface 41.

The conditions under which the softened glass material is pressed in the forming mold (temperature of the glass material and forming mold, pressing temperature and time, and the like) may be suitably determined in consideration of the shape of the glass being formed or the like.

Following press-molding, the forming mold is cooled until the glass to which shapes of the molding surfaces have been transferred reaches a prescribed viscosity.

Cooling of the forming mold begins either simultaneously with the start of application of pressure for press-molding, during press-molding, or upon completion of press-molding.

Following cooling of the forming mold to a prescribed temperature, the molded glass is removed from the forming mold.

In the manufacturing method of the present invention, post pressing of the glass to which the shapes of the molding surfaces have been transferred is preferably conducted from the completion of the application of pressure for press-molding to removal of the glass material from the forming mold. Post pressing, application of the secondary pressure, is begun when the glass to which the shapes of the molding surfaces have been transferred reaches substantially the same thickness as the targeted glass optical element. The substantially same thickness means that a center thickness of the pressed glass material is within ±0.2mm range of a center thickness of the glass optical element. During the cooling step, the molded glass is temporarily maintained within a prescribed temperature range for a prescribed period.

Preferably, post pressing is continuously conducted from the completion of press-molding so that pressing is uninterrupted. That is, after press-molding, post pressing begins without complete release of pressure for the press-molding. Further, the temperature of the molded glass material is maintained within the prescribed range for a prescribed period at any time during the cooling step. This state will be described in view of FIG. 1.

A softened glass material of temperature t is subjected to a pressure P to transfer the shapes of the molding surfaces. P, as the load, may be suitably selected based on the viscosity of the glass material, the shape of the lens to be obtained, or the like. Examples are $9.8 \times 10^4$–$294 \times 10^4$ Pa, preferably $9.8 \times 10^4$–$196 \times 10^4$ Pa.

Following press-molding at pressure P, pressing is continued at pressure P1 without ever completely removing pressure. Following the end of press-molding at pressure P, the forming mold is cooled (primary cooling). However, primary cooling may begin simultaneously with press-molding or during press-molding. Primary cooling can be conducted at a relatively rapid cooling rate generating internal distortion in the molded glass; for example, 10 degrees centigrade/mm or more, preferably 10–300 degrees centigrade/mm, and still more preferably, 30–200 degrees centigrade/mm.

Once the forming mold has been cooled by primary cooling to a prescribed temperature of t1, it is subjected to pressing at a prescribed pressure P2. However, cooling of the forming mold, as set forth above, may begin either simultaneously with the start of press-molding or during press-molding.

Although pressures for pressure P1 and pressure P2 shown in FIG. 1 are different, they may be a single identical pressure. Further, the temperature during pressing at prescribed pressure P2 may be constant at t1, or may be gradually decreased from t1. The temperature during pressing at prescribed pressure P2 is conducted under conditions alleviating the internal distortion generated in the molded glass by the primary cooling. For example, cooling may be conducted at 0–5 degrees centigrade/mm, preferably about 0 degree centigrade/mm.

The temperature range that is maintained at least for a predetermined time runs from a temperature of 50 degrees centigrade below the glass transition temperature (Tg) of the glass optical element (Tg−50 degrees centigrade) to Tg+30 for the following reasons. This temperature range permits alleviation of internal distortion causing surface shape deterioration of the lens once the lens has been removed from the mold while maintaining the surface shape that has been obtained by transferal of the molding surfaces. Further, alleviation of internal distortion within the above temperature range inhibits the generation of new internal distortion during the subsequent step of cooling to the removal temperature.

The above-stated temperature range that is to be maintained is preferably (Tg−50 degrees centigrade) to Tg, and more preferably (Tg−20 degrees centigrade) to Tg. From the perspective of improving the final surface shape of the product, starting of the temperature maintenance is desirably at a point where the temperature of the molded glass material has dropped to Tg or below.

After being maintained within this temperature range for a prescribed period, the forming mold is further cooled. Once the molded glass has been cooled to a prescribed viscosity, a viscosity permitting the maintenance of a surface precision where there are not more than 0.8 irregularities, such as Tg−50 degrees centigrade or less, for example, to room temperature, the molded glass is removed from the mold. Post pressure P3 is continuously applied during the period running from maintenance of a prescribed temperature range through to removal. Pressure P3 may be identical to or different from P1 and P2.

Post pressures P1, P2, and P3 are suitably loads that make the transferred surface of the glass to which the molding surfaces of the forming mold have been transferred by pressure P continuously retain the shape of the molding surfaces. Specifically, they may be suitably selected in view of the viscosity of the glass at the time maintenance is conducted, the shape of the molding surfaces, and the like. Normally, for post pressures P1, P2, and P3, pressures not greater than P are desirable from the perspective of maintaining the formed shape. However, P1–P3 are preferably pressures that change little the thickness of the glass that has been molded by pressure P. Specifically, the change in thickness due to P1–P3 falls within the center thickness tolerance of the lens that is obtained, for example, ±0.03 mm, preferably about 0.001–0.12 mm.

Further, P2 is conducted at a load capable of alleviating internal distortion within the glass while applying a pressure causing the transferred surfaces of the glass to which the molding surfaces of the forming mold have been transferred to retain the shape of the molding surfaces. Specifically, this pressure may be suitably selected based on the viscosity of the glass at the time and the shape of the molding surfaces.

When P2 is excessively low, pressing in a state retaining the particular shape becomes difficult. This tends to result in the development of partial or total irregularities.

By contrast, when the load of P2 is excessively high, internal distortion within the glass tends not to be alleviated and sometimes fails to be alleviated to a degree adequate to maintain the shape of the lens removed from the mold. As a result, irregularities tend to develop near the optical center of the molded glass.

The post pressing conditions (pressure and temperature) and the maintenance conditions (temperature range and time) are suitably set to keep the irregularities observed in the molded glass to not greater than one, preferably not greater than 0.5, and more preferably not greater than 0.3.

Maintenance time ti during the cooling step desirably falls within the following range when the center thickness of the glass optical element, the product, is denoted as a and the peripheral thickness as b:

when $1.5 \leq b/a < 2.0$, $0 < t_1 \leq 120$ seconds, preferably $10 < t_1 \leq 120$ seconds,
more preferably $20 < t_1 \leq 120$ seconds,
when $2.0 \leq b/a < 2.5$, $20 < t_1 \leq 180$ seconds, preferably $60 < t_1 \leq 180$ seconds,
when $2.5 \leq b/a$, $120 \leq t_1$,
when $2.5 \leq b/a$, preferably $120 < t_1 \leq 350$ seconds.

After maintaining the above-stated temperature, the forming mold is further cooled (secondary cooling). When the molded glass reaches Tg or below, it is removed from the forming mold. The secondary cooling rate may be, for example, 10 degrees centigrade/mm or more, preferably 10–300 degrees centigrade/mm, and more preferably 30–200 degrees centigrade/mm.

Post pressing is conducted at pressure P3 during secondary cooling, as well. Pressure P3 may be identical to P1 and P2 or different. However, P3 is desirably a load that permits pressure application causing the transferred surfaces of the glass to retain the shape of the molding surfaces and that does not generate new internal distortion within the glass. From this perspective, P3 is preferably lower than P1 and P2, with, for example, $0.0098 \times 10^4 - 49 \times 10^4$ Pa being preferred, and $0.0098 \times 10^4 - 4.9 \times 10^4$ Pa being more preferred.

The molded glass obtained by the manufacturing method of the present invention may be a lens having one or two concave surfaces. In particular, the molded glass may be a lens one surface of which is concave surface and the other surface of which is convex (for example, the convex surface may be spherical).

Further, the manufacturing method of the present invention permits the manufacturing of lenses in which the ratio b/a of peripheral thickness b to center thickness a is 1.5 or greater, preferably 2 or greater.

EXAMPLES

The present invention is further described below based on the following Examples.

Figure 3:
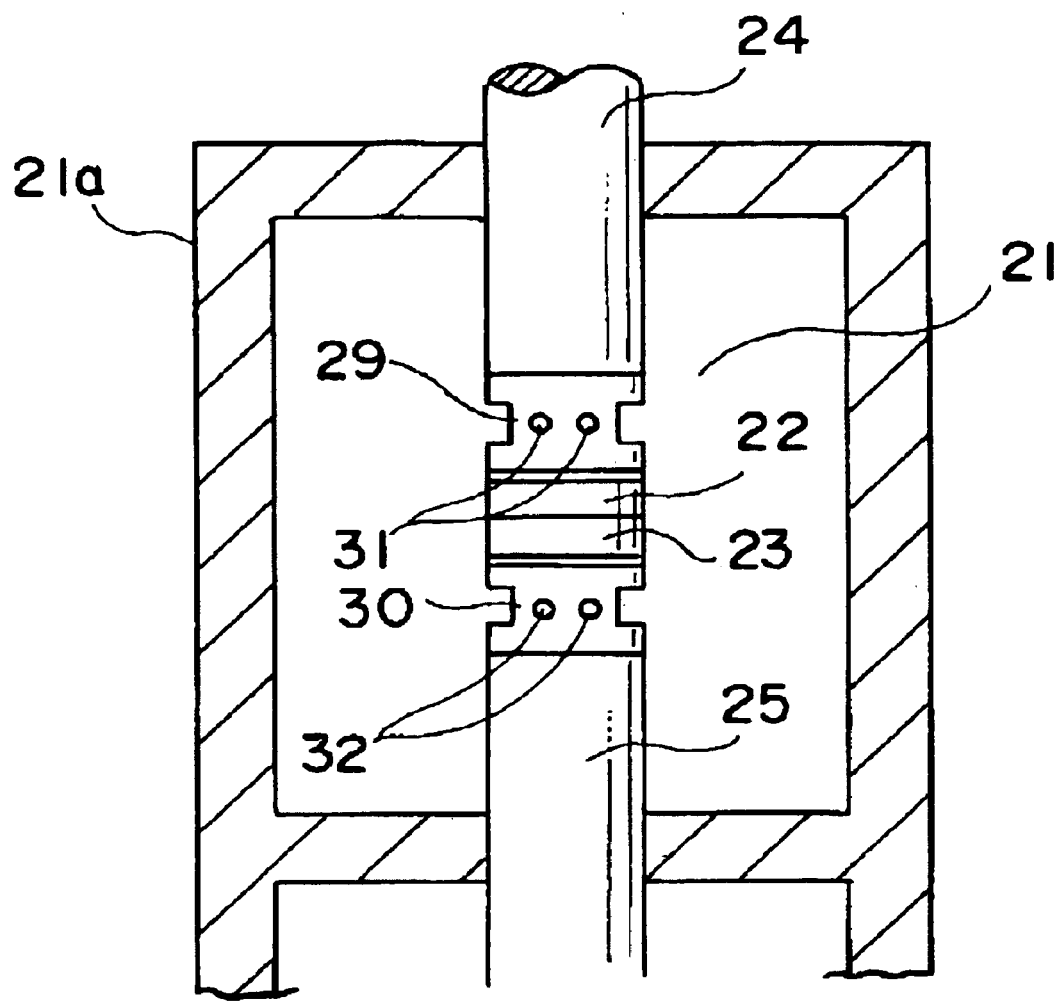
FIG. 3 is a schematic drawing of the molding device employed in Examples 1–3.

The molding device shown in FIG. 3 was employed in Examples 1–3.

In the molding device shown in FIG. 3, an upper mold 22 and a lower mold 23 are disposed within a hot molding chamber 21 sealed within a housing 21a. Upper mold 22 and lower mold 23 are secured through adiabatic bases 29 and 30 to the front ends of upper fixed shaft 24 and lower movable shaft 25, respectively. Lower movable shaft 25 is linked to a pressure cylinder, not shown, by which it is driven upward during pressure application.

Further, adiabatic bases 29 and 30 have cooling gas outlets 31 and 32, respectively, for independently cooling upper mold 22 and lower mold 23. The supply of gas can be independently controlled above and below, permitting change in the cooling rates of upper mold 22 and lower mold 23. An inert gas was employed as the cooling gas.

Example 1

Figure 4:
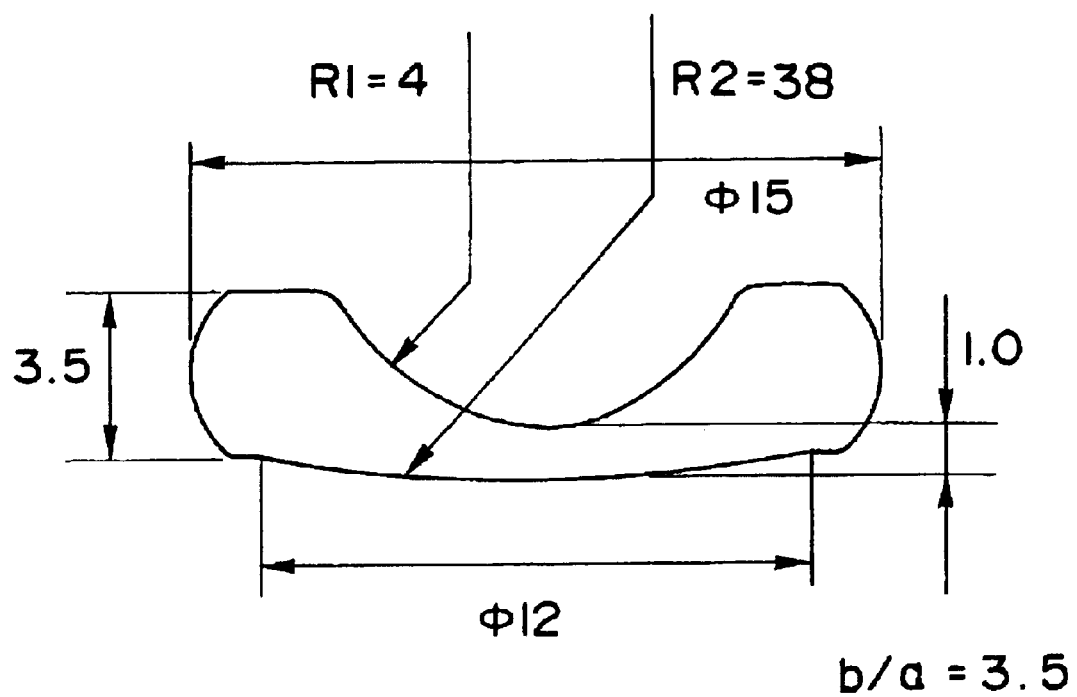
FIG. 4 is a descriptive drawing of the glass lenses manufactured in Examples 1 and 2.

The glass lens (ratio b/a=3.5, oblate spherical lens) of the shape shown in FIG. 4, one surface of which was concave (radius of curvature R=4 mm) and the other surface of which was convex (radius of curvature R=38 mm) was manufactured. The concave surface was formed with the upper mold and the convex surface with the lower mold. LaC13 (Tg=520 degrees centigrade, Ts=560 degrees centigrade) was employed as the glass material.

Figure 5:
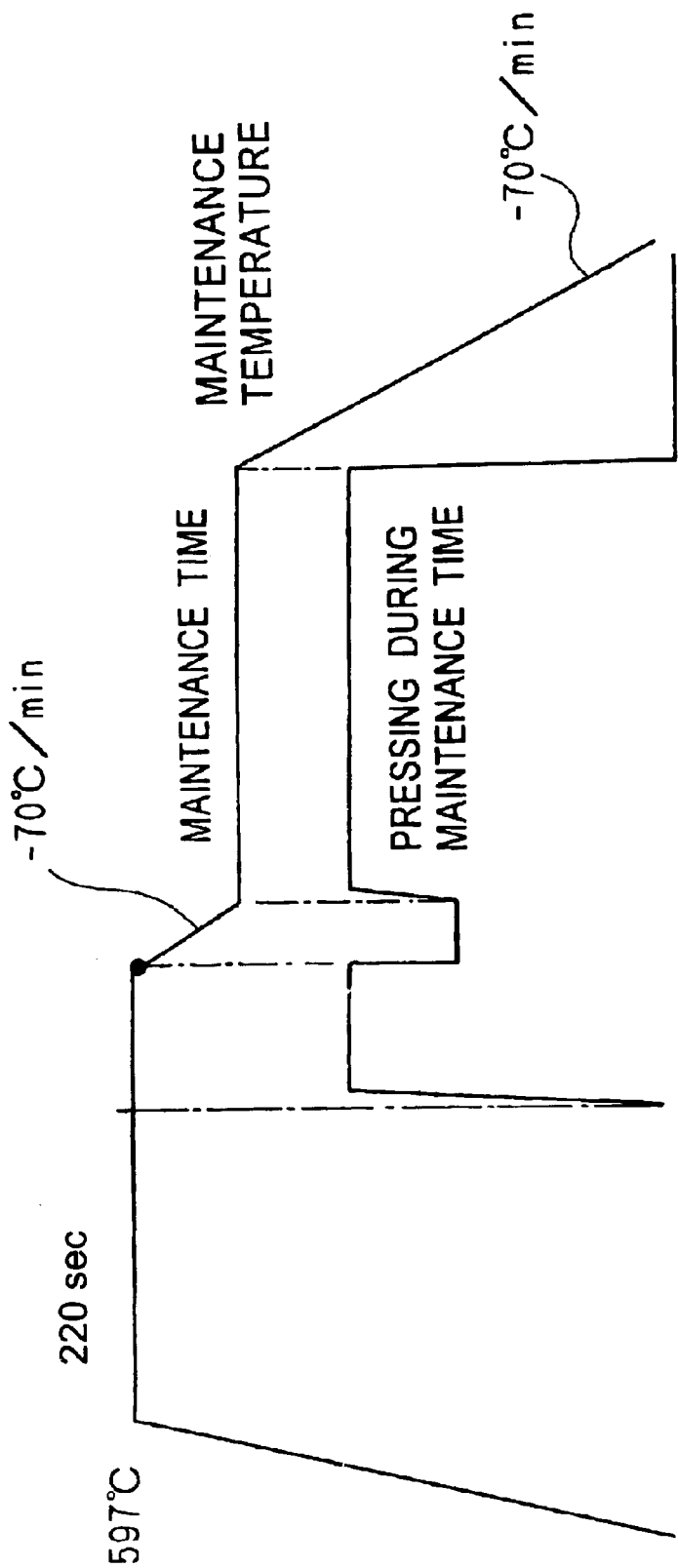
FIG. 5 shows the changes over time in temperature and pressure applied in the forming mold of Example 1.

The basic molding conditions (temperature, pressure, time) are given in FIG. 5, and the detailed molding conditions in Table 1. The results are also given in Table 1. An explanation of ranking of the annealed products is given in Table 2, which is shown in the column of results in Table 1. Examples 1–15 are working Examples of the present invention.

TABLE 1

| Sample | Maintenance time (Second) | Maintenance temperature (° C.) | Post-pressurization pressure (Pa) | Results |
|---|---|---|---|---|
| 1 | 300 | 510 (Tg − 10° C.) | 29.4 × 10⁴ | A |
| 2 | 100 | 510 (Tg − 10° C.) | 29.4 × 10⁴ | A |
| 3 | 100 | 530 (Tg + 10° C.) | 29.4 × 10⁴ | B |
| 4 | 300 | 530 (Tg + 10° C.) | 29.4 × 10⁴ | A |
| 5 | 100 | 510 (Tg − 10° C.) | 14.7 × 10⁴ | C (Circumference part) |
| 6 | 300 | 510 (Tg − 10° C.) | 19.6 × 10⁴ | A |
| 7 | 300 | 530 (Tg + 10° C.) | 19.6 × 10⁴ | B |
| 8 | 100 | 510 (Tg − 10° C.) | 19.6 × 10⁴ | A |
| 9 | 100 | 530 (Tg + 10° C.) | 19.6 × 10⁴ | C |
| 10 | 50 | 510 (Tg − 10° C.) | 29.4 × 10⁴ | A |
| 11 | 50 | 510 (Tg − 10° C.) | 19.6 × 10⁴ | C (Circumference part) |
| 12 | 50 | 530 (Tg + 10° C.) | 29.4 × 10⁴ | B |
| 13 | 50 | 530 (Tg + 10° C.) | 19.6 × 10⁴ | C (Circumference part) |
| 14 | 50 | 490 (Tg − 30° C.) | 29.4 × 10⁴ | B |
| 15 | 50 | 490 (Tg − 30° C.) | 19.6 × 10⁴ | A |

TABLE 2

| Rank | Irregularity |
|---|---|
| A | 0.3 fringes or less |
| B | 0.3–0.5 fringes |
| C | 0.5–0.8 fringes |
| D | 0.8 fringes or more |

Example 2

Figure 6:
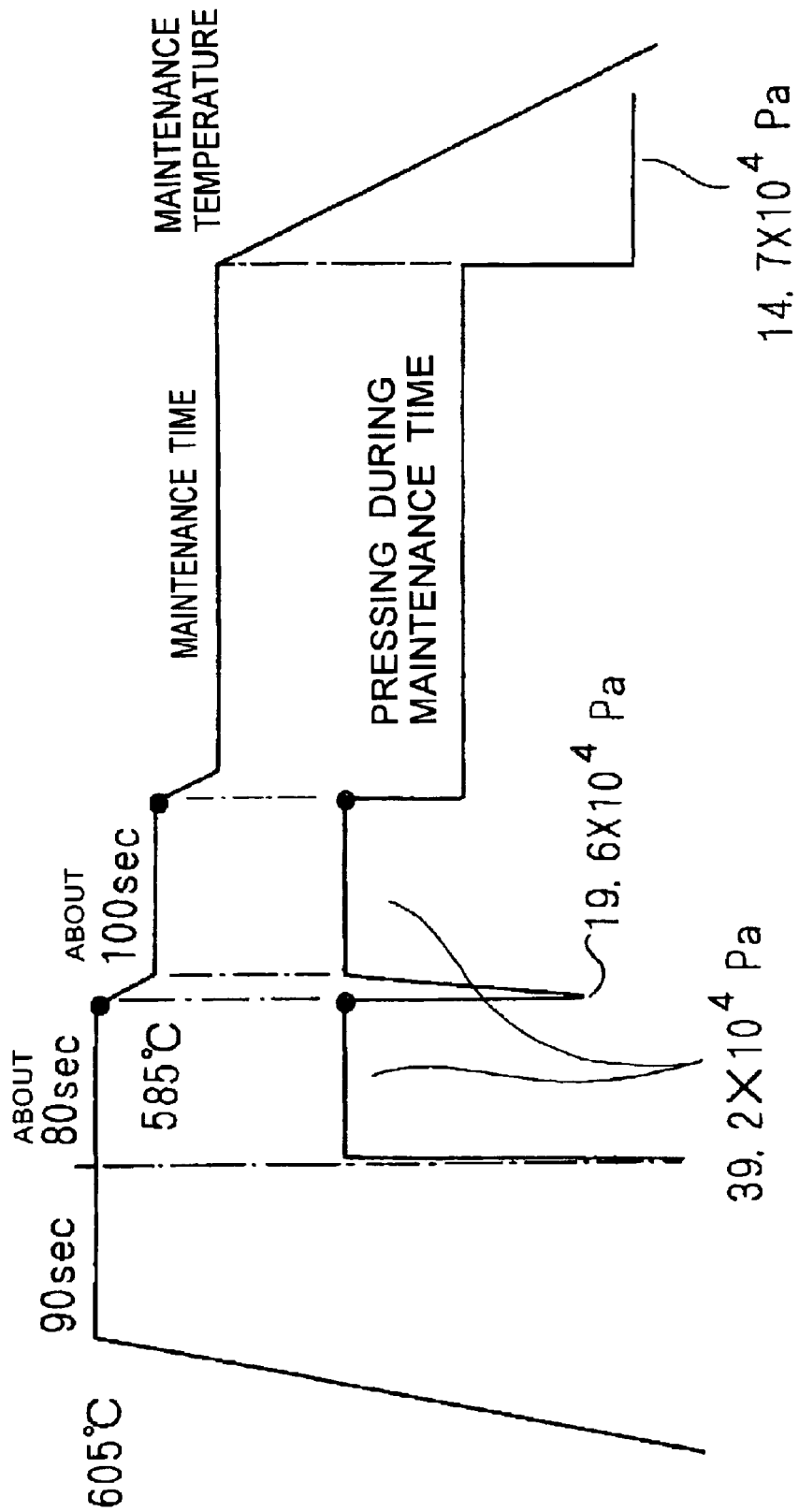
FIG. 6 shows the changes over time in temperature and pressure applied in the forming mold of Example 2.

Employing the same glass material and device as in Example 1, a lens was molded by the manufacturing method in accordance with the temperature, pressure, and time scheme given in FIG. 6.

The molding conditions and results are given in Table 3. An explanation of ranking of the annealed product is given in Table 2, which is shown in the column of results in Table 1. Examples 2–8 are working Examples of the present invention.

TABLE 3

| Sample | Maintenance time (Second) | Maintenance temperature (° C.) | Post-pressurization pressure (Pa) | Results |
|---|---|---|---|---|
| 1 | 0 sec | | | D |
| 2 - ① | 60 sec | 530° C. | 39.2 × 10⁴ | C |

TABLE 3-continued

| Sample | Maintenance time (Second) | Maintenance temperature (° C.) | Post-pressurization pressure (Pa) | Results |
|---|---|---|---|---|
| 2 - ② | 180 sec | 530° C. | 39.2 × 10⁴ | C |
| 3 - ② | 180 sec | 500° C. | 39.2 × 10⁴ | C |
| 4 - ① | 60 sec | 500° C. | 29.4 × 10⁴ | C |
| 4 - ② | 180 sec | 500° C. | 29.4 × 10⁴ | C |
| 5 | 300 sec | 500° C. | 29.4 × 10⁴ | A |
| 6 | 300 sec | 530° C. | 29.4 × 10⁴ | C (Circumference part) |
| 7 | 300 sec | 530° C. | 39.2 × 10⁴ | B |
| 8 | 300 sec | 500° C. | 39.2 × 10⁴ | B |

Example 3

Figure 7:
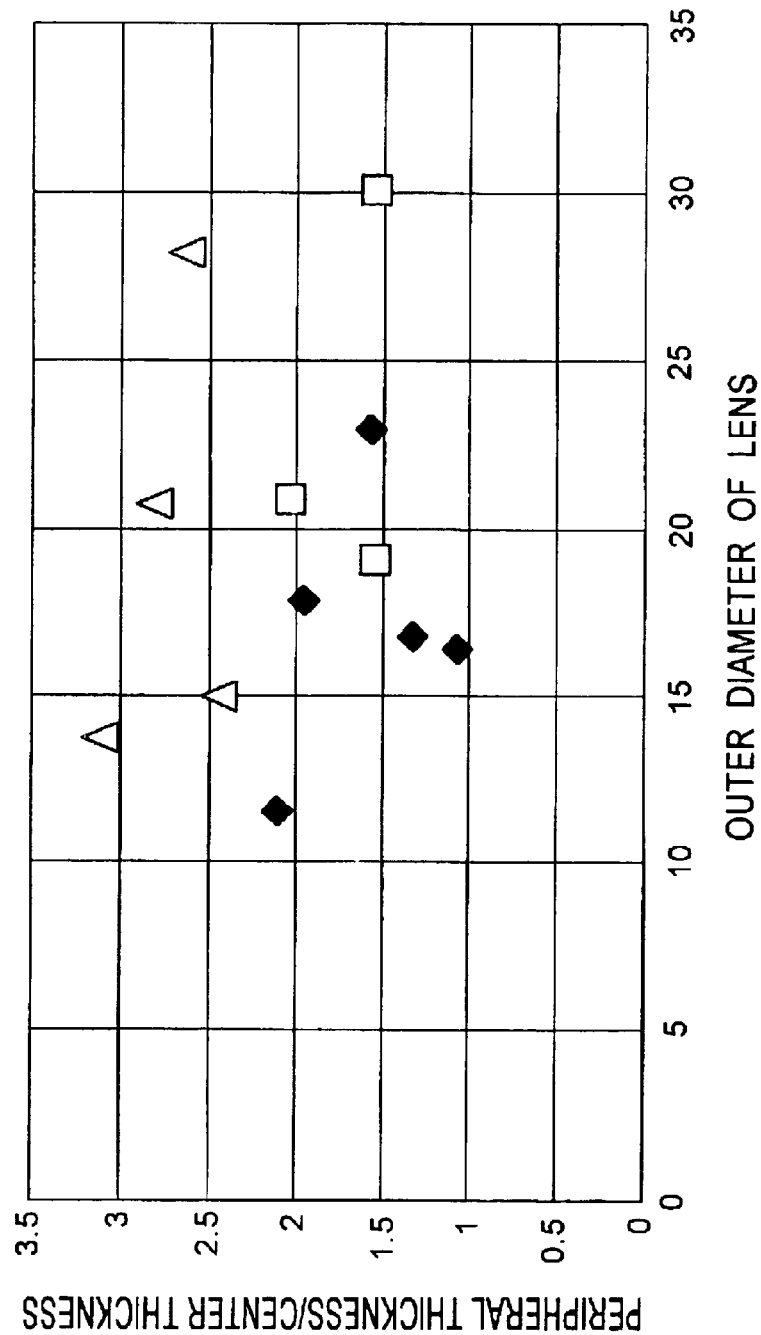
FIG. 7 shows the maintenance time required to achieve not greater than 0.5 irregularities when manufacturing the lenses of different rim thickness, center thickness, and outer diameter of Example 3.

Employing the same glass material and device as in Example 1, lenses of differing rim thickness, center thickness, and outer diameter were manufactured under the same conditions as in Example 1, and the maintenance times required to achieve an irregularity of not greater than 0.5 were determined. The results are given in FIG. 7.

The present disclosure relates to the subject matter contained in Japanese Patent Application No. 2000-265300 filed on Sep. 1, 2000, which is expressly incorporated herein by reference in its entirety.

What is claimed is:

1. A method for manufacturing a glass optical element comprising:
   molding a glass material softened by heat with a molding device which comprises an upper mold having a molding surface and a lower mold having a molding surface by applying a molding pressure to obtain a molded glass material;
   cooling the molded glass material; and
   removing the molded glass material from the molding device,
   wherein a secondary pressure is continuously applied to the glass material following the application of the molding pressure, and a temperature of the molded glass material is maintained for a period of time during the cooling within a range of (Tg+30) to (Tg−50) degrees centigrade so that strain in the molded glass material is reduced, Tg representing a glass transition temperature of the glass material, and
   wherein temperature variation of the glass material during the period of time is at most 5 degrees centigrade per minute.

2. The method of claim 1, wherein the secondary pressure is continuously applied up to the removing of the glass.

3. The method of claim 2, wherein the secondary pressure is smaller than the molding pressure.

4. The method of claim 3, wherein the secondary pressure is set at pressure P1 before the beginning of the period of time and the secondary pressure is set at pressure P2 during the period of time, where P2 is greater than P1.

5. The method of claim 2, wherein the temperature variation is substantially null.

6. The method of claim 2, wherein the temperature of the glass material is maintained within a range of (Tg) to (Tg−50) degrees centigrade for the period of time during the cooling.

7. The method of claim 3, wherein the temperature of the glass material is maintained within a range of (Tg) to (Tg−50) degrees centigrade for the period of time during the cooling.

8. The method of claim 7, wherein the temperature of the glass material is maintained within a range of (Tg) to (Tg−20) degrees centigrade for the period of time during the cooling.

9. The method of claim 2 wherein the secondary pressure is started to apply when a center thickness of the glass material is within ±0.2 mm range of the glass optical element.

10. The method of claim 3 wherein the molding pressure is within the range of $294 \times 10^4$ Pa to $3432 \times 10^4$ Pa, and the secondary pressure is within the range of $0.0098 \times 10^4$ Pa to $49 \times 10^4$ Pa.

11. The method of claim 3 wherein the glass optical element comprises at least one concave surface.

12. The method of claim 11 wherein the glass optical element comprises one concave surface and one convex surface.

13. The method of claim 12 wherein the convex surface comprises a spherical surface.

14. The method of claim 11 wherein b/a is at least 1.5 where a represents a center thickness of the glass optical element and b represents a peripheral thickness of the glass optical element.

15. The method of claim 14 wherein the b/a is at least 2.

16. The method of claim 2, wherein the period of time is determined by the following inequalities:

$0 < t_1 \leq 120$(sec) when $1.5 \leq b/a < 2.0$,
$20 < t_1 \leq 180$(sec) when $2.0 \leq b/a < 2.5$, and
$120$(sec) $< t_1$ when $2.5 \leq b/a$, where a represents a center thickness of the glass optical element b represents a peripheral thickness of the glass optical element, and $t_1$ represents the period of time.

17. The method of claim 16, wherein the period of time is determined by the following inequalities:

$0 < t_1 \leq 120$(sec) when $1.5 \leq b/a < 2.0$,
$20 < t_1 \leq 180$(sec) when $2.0 \leq b/a < 2.5$, and
$120$(sec) $< t_1$ when $2.5 \leq b/a$.

18. The method of claim 17, wherein the period of time is determined by the following inequalities:

$0 < t_1 \leq 120$(sec) when $1.5 \leq b/a < 2.0$,
$20 < t_1 \leq 180$(sec) when $2.0 \leq b/a < 2.5$, and
$120$(sec) $< t_1$ when $2.5 \leq b/a$.

19. The method of claim 18, wherein the period of time is determined by the following inequality:

$120$(sec) $< t_1 \leq 350$(sec) when $2.5 \leq b/a$.

20. The method of claim 3 wherein the glass material has two convex surfaces.

21. The method of claim 7, wherein the period of time and the maintained temperature are determined so that the irregularity in an optically functional surface of the optical element is 0.8 fringes or less in Newton rings.

22. The method of claim 9 wherein the secondary pressure is started to apply when a center thickness of the glass material is within ±0.03 mm range of the glass optical element.

23. The method of claim 21, wherein the period of time and the maintained temperature are determined so that the irregularity in an optically functional surface of the optical element is 0.5 fringes or less in Newton rings.

24. The method of claim 9, wherein the glass optical element is the double-concave lens.

25. The method of claim 2, wherein cooling of the molds is started simultaneously with the start of application of the molding pressure, during the application of the molding pressure, or upon completion of the application of molding pressure.

26. The method of claim 2, wherein cooling of the molds are started at an end of application of the molding pressure.

27. The method of claim 3, wherein the secondary pressure is set at pressure P1 before the beginning of the temperature maintenance, the secondary pressure is set at pressure P2 during the temperature maintenance, and the secondary pressure is set at pressure P3 after the temperature maintenance, wherein P3<P1<P2.

28. The method of claim 3, wherein primary cooling of the molds is carried out before the temperature maintenance and the secondary cooling of the molds is carried out after the temperature maintenance whereby a primary cooling rate and a secondary cooling rate are 30 degrees centigrade to 200 degrees centigrade per minute.

* * * * *